(12) United States Patent
Kilpatrick (10) Patent No.: US 8,462,158 B2
(45) Date of Patent: **\*Jun. 11, 2013**

(54) TRANSLATING RENDERMAN SHADING LANGUAGE CODE

(75) Inventor: Charlie A. Kilpatrick, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,563

(22) Filed: May 25, 2012

(65) Prior Publication Data

US 2013/0021343 A1  Jan. 24, 2013

Related U.S. Application Data (63) Continuation of application No. 11/945,946, filed on Nov. 27, 2007, now Pat. No. 8,189,004.

(60) Provisional application No. 60/986,862, filed on Nov. 9, 2007.

(51) Int. Cl.
  *G06T 15/50* (2011.01)
  *G06T 1/00* (2006.01)

(52) U.S. Cl.
  USPC ............................ 345/426; 345/501; 345/522

(58) Field of Classification Search
  USPC ........................... 345/426, 501, 522, 530, 545
  See application file for complete search history.

(56) References Cited

U.S. PATENT DOCUMENTS

| | | | |
|---|---|---|---|
| 6,339,428 B1 | 1/2002 | Fowler et al. | |
| 6,578,197 B1 | 6/2003 | Peercy et al. | |
| 7,159,212 B2 | 1/2007 | Schenk et al. | |
| 7,640,421 B1 | 12/2009 | Garlick | |
| 7,889,205 B1 | 2/2011 | Parenteau et al. | |
| 2006/0098022 A1 | 5/2006 | Andrews et al. | |
| 2006/0274070 A1 | 12/2006 | Herman | |
| 2009/0113402 A1 | 4/2009 | Chen et al. | |

OTHER PUBLICATIONS

Bleiweiss et al., Advanced Shading Language, ATI Research Silicon Valley, Inc., presentation (2003), 14 pages.
Bleiweiss et al., Ashli-Advanced Shading Language Interface, ATI Research, Inc. (2003), pp. 13-1 to 13-21.
Guenter et al., "Specializing shaders," SIGGRAPH, 1995, 8 pages.
Kilgard, Mark J., Cg in Two Pages, NVIDIA Corporation, Austin, TX (Jan. 16, 2003), pp. 1-2.
Knoblock and Ruf, "Data Specialization", SIGPLAN Notices Conference, 1996, 31(5):215-225.
Olano et al., "Real-Time Shading", Aug. 2004, SIGGRAPH 2004 Course Notes, pp. 3-3, 3-15, 6-1, 6-2, 6-18.
Pellacini et al., "pics: a hybrid hardware-accelerated relighting engine for computer cinematography," SIGGRAPH, 2005, 7 pages.
Pellacini, "User-configurable automatic shader simplification," SIGGRAPH, 2005, 8 pages.
Ragan-Kelley, Jonathan Millard, Practical Interactive Lighting Design for RenderMan Scenes, thesis, May 2004, 70 pages.
Ragan-Kelly et al., The Lightspeed Automatic Interactive Lighting Preview System, Jul. 2007, ACM Transactions on Graphics 26, 3 Article 25, pp. 1-11.
Buck, et al. "Brook for GPUs: stream computing on graphics hardware" In ACM SIGGRAPH 2004 Papers (SIGGRAPH '04), 2004, pp. 777-786.

*Primary Examiner* — Joni Richer
(74) *Attorney, Agent, or Firm* — Kilpatrick Townsend & Stockton LLP (57) ABSTRACT

The present disclosure includes, among other things, systems, methods and program products for translating RenderMan shading language code.

16 Claims, 9 Drawing Sheets

```
/*
 * INPUTS
 *
 *   Variable      Description
 *
 *   Kd, Ka, Ks    usual
 *   roughness        "
 *   specularcolor    "
 *   texturename   texture-map name
 */ surface plastic(
    float Ks=.2;
    float Kd=.3;
    float  Ka=1;
    float  roughness=.42;
    color specularcolor=1;
    string texturename;
)
{
    normal Nf;
    vector V;
    color Ct;

Nf = faceforward( normalize(N), I );
    V = -normalize(I);

float ss;
    float tt;

Ct = (texturename != "bendable")? color texture (texturename, ss, tt):
color 1.0;

/* Ct = color (ss, tt, 0); */

Oi = Os;
    Ci = Os * ( Cs * Ct * (Ka*ambient() + Kd*diffuse(Nf)) +
                specularcolor * Ks * specular(Nf,V,roughness) );
}
```

TRANSLATING RENDERMAN SHADING LANGUAGE CODE

CROSS-REFERENCE TO RELATED APPLICATIONS

This application is a continuation of U.S. patent application Ser. No. 11/945,946, filed Nov. 27, 2007, now U.S. Pat. No. 8,189,004, which claims priority to pending U.S. Provisional Application Ser. No. 60/986,862, filed Nov. 9, 2007, the entire contents of which are hereby incorporated by reference.

BACKGROUND

Within the context of a deep-framebuffer based preview renderer, it is sometimes necessary to translate shader code written in one shading language to another shading language that will run on programmable graphics hardware (GPUs). For example, when translating shader code written in RenderMan Shading Language (RSL) to a language that runs on GPUs, such as Cg, an issue that can arise is that the Cg language has limited support for the string data type in comparison to RSL. This issue is compounded when one considers the different uses of strings in RSL shaders, such as for naming coordinate systems, for referring to textures, for comparisons and for assignments.

SUMMARY

In general, one or more aspects of the subject matter described in this specification can be embodied in one or more methods that include identifying string occurrences in a first shader in a first shading language, where each occurrence is a literal string or a non-literal string value. Each string occurrence is mapped to a non-string representation and each representation is stored in a memory for access by a second shader during execution of the second shader, where identical string values are mapped to identical non-string representations. The first shader is translated to a distinct second shading language to create the second shader where each string occurrence is translated to an access to the memory for the string occurrence's respective non-string representation. Other embodiments of this aspect include corresponding systems, apparatus, and computer program products.

These and other embodiments can optionally include one or more of the following features. The value of a string occurrence can be determined by evaluating one or more shading language expressions in the first shading language to determine each occurrence's string value. Evaluating the one or more shading language expressions can include executing code that is not part of the first shader. The second shader can be configured to be executed on a graphics processor unit. The memory can be included in the graphics processor unit. The memory can be a deep-framebuffer, a data structure or a shader parameter. A string value can represent a coordinate system, a texture, or a string value. A non-string representation can be one or more of: a unique integer or floating-point number, a texture reference, a matrix, and a structure. The first shading language can be RenderMan Shading Language and the second shading language is Cg. One or more input strings can be received. Each input string's value can be mapped to a non-string representation, where identical input string values are mapped to identical non-string representations; and each input string's representation can be stored in the memory for access by a second shader.

In general, one or more aspects of the subject matter described in this specification can be embodied in one or more methods that include identifying string occurrences in a first shader in a first shading language, where each occurrence is a literal string or a non-literal string value. For each string occurrence, if the occurrence represents a coordinate system, the value is represented as one or more matrices in a memory for access by a second shader in a distinct second shading language. For each string occurrence, if the occurrence represents a texture or a string, the value is represented as a texture reference or a number, respectively, in the memory. The first shakier is translated to create the second shader where each string occurrence is translated to an access to the memory for the string occurrence's respective representation. Other embodiments of this aspect include corresponding systems, apparatus, and computer program products.

These and other embodiments can optionally include one or more of the following features. The first shading language can be RenderMan Shading Language and the second shading language is Cg. Identical string occurrences can have corresponding identical non-string representations in the memory.

Particular embodiments of the subject matter described in this specification can be implemented to realize one or more of the following advantages. RSL code can be automatically translated to Cg code such that the semantics of string usage in the RSL code are preserved in the Cg code. A Cg structure data type can be used to encode information that is needed to evaluate the Cg code at run-time for the common uses of strings within RSL code. Unique identifiers are assigned to string values that occur within the RSL code either at compile-time, or RSL or Cg run-time, and then are accessed at Cg run-time. Non-string representations of RSL strings can also be stored in deep-framebuffers for access by Cg shaders during preview rendering.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
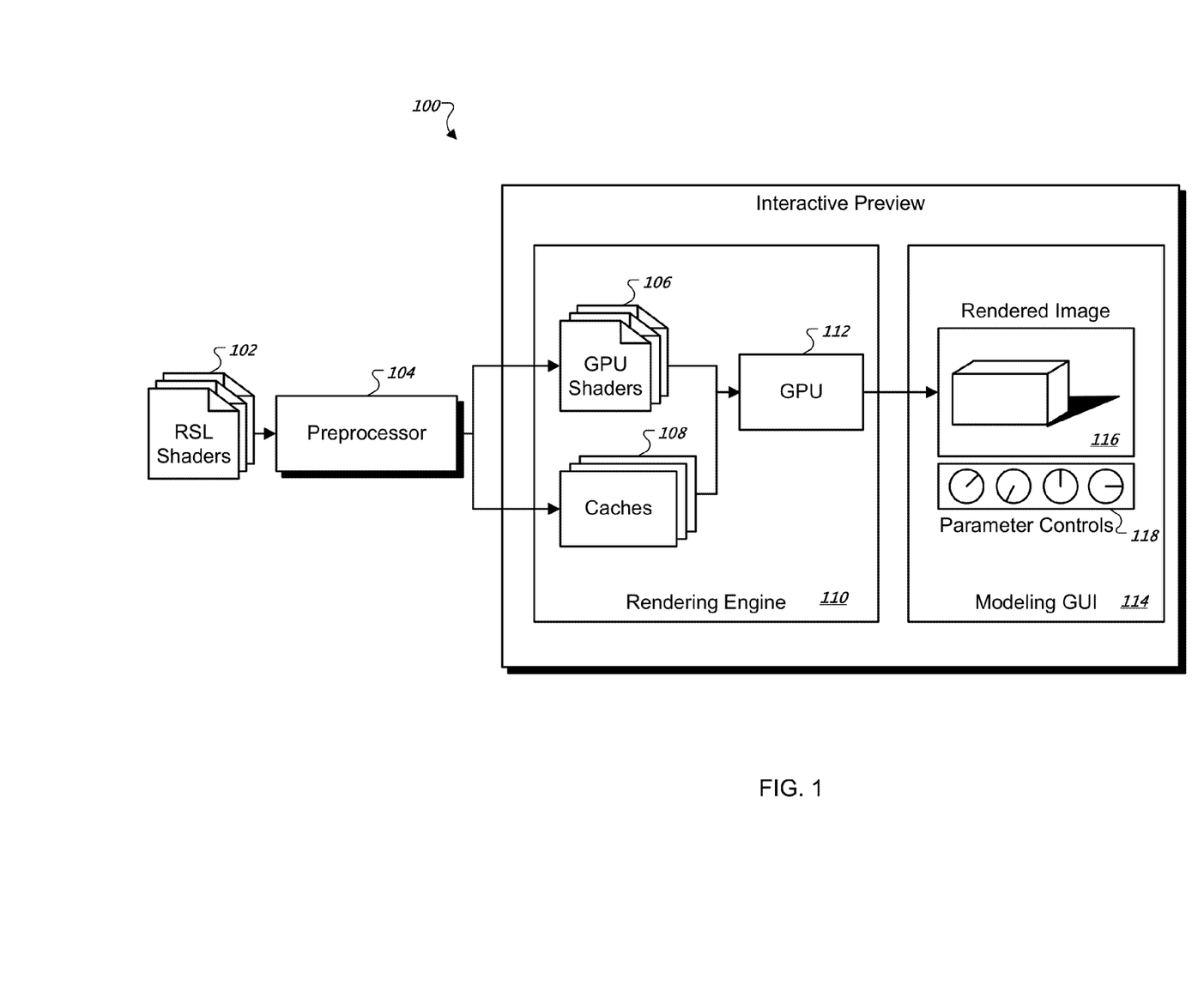
FIG. 1 is a block diagram of an example interactive 3D preview system.

FIG. 1 is a block diagram of an example interactive three-dimensional (3D) preview system 100. The interactive preview system 100 can be used to provide fast preview rendering of 3D scene geometry (hereinafter referred to as a "scene") or other 3D models. In various implementations, the preview system 100 allows a user to interactively manipulate parameters of the scene geometry including lighting parameters. A preview of the scene 116 based on the manipulated parameters can be generated by the preview system 100 and displayed on one or more display devices. For example, light source parameters such as light intensity, light position and light falloff can be adjusted and their effect on a scene previewed. As another example, material appearance parameters such as a material's specular and diffuse reflection properties can be modified and previewed.

The preview system 100 is initially provided with one or more input shaders 102 coded in a source shading language such as RSL, for instance. Generally speaking, a shader is a computer program that calculates the properties affecting the visual appearance of an scene, a portion of a scene, or an image. The input shaders 102 are automatically translated into target shaders 106 in a target shading language such as Cg, for instance, that can be executed on a GPU. Other source and target shading languages are possible including, but not limited to, high-level shader language (HLSL) and the OpenGL shading language (GLSL). The preview system 100 uses a preprocessor 104 to translate the input shaders 102 into the target shaders 106.

In various implementations, part of the translation process involves translating string expressions in the input shaders 102 into equivalent expressions involving non-string representations in the target shaders 106. In various implementations, non-string representations for strings representing coordinate systems in the input shaders 102 are converted to one or more matrices in the target shaders 106. Whereas strings representing textures or other string values are converted to texture references and floating point numbers, respectively, in the target shaders 106. Other conversions are possible.

The input shaders 102 contain expressions involving literal strings (e.g., constants) and non-literal strings (e.g., non-constants or variables). The values of literal string expressions in the input shaders 102 are determined at compile time and, hence, non-string representations for literal string expressions can be determined at compile time by the preprocessor 104. Because determining the values of non-literal string expressions may require that the expressions be evaluated at shader runtime, non-string representations for non-literal string expressions can be determined at shader runtime and, in some embodiments, may be stored in cache 108 for access by the target shaders 106 executing on the GPU 112. This is described in more detail in reference to FIG. 2A below.

In various implementations, the preview system 100 allows users to modify runtime parameters for the target shaders 106 through parameter controls 118 available in a graphical user interface (GUI) 114. The parameter controls 118 can be realized as a series of visual dials, menus, or other GUI elements, for example. In various implementations, parameters that are set by the controls 118 represent non-literal strings in the target shaders 106 (e.g., coordinate systems, light source parameters, material properties). A change to a parameter causes a new value for a non-literal string in a target shader 106 to be provided to the target shader 106. Similar to the preprocessor 104, the modeling GUI 114 is able to determine non-string representations for the input parameters. These are then made available to the target shaders 106 through a memory accessible by the GUI 112.

Figure 2A:
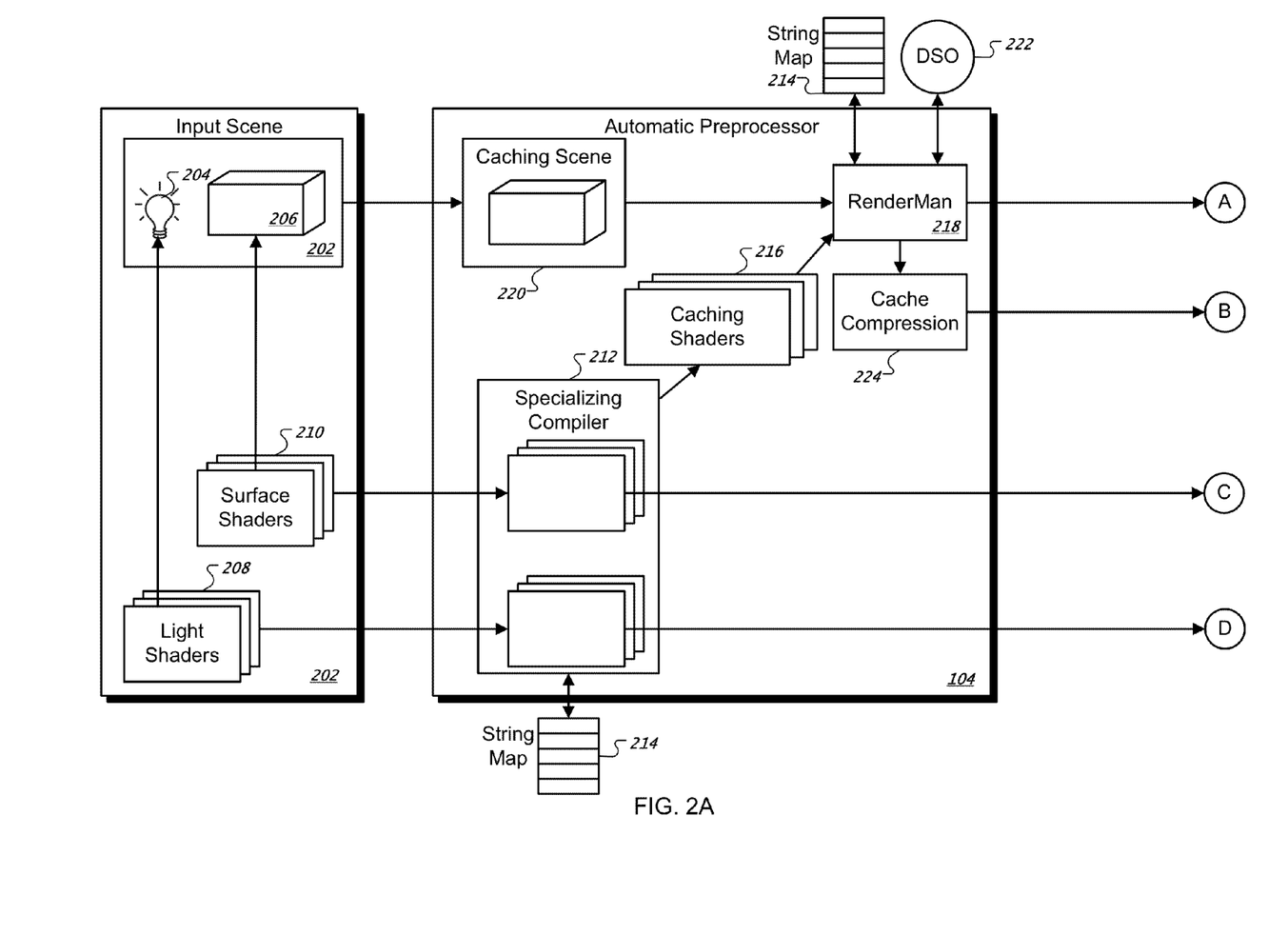
FIGS. 2A and 2B are block diagrams of additional aspects of the 3D preview system.
Figure 2B:
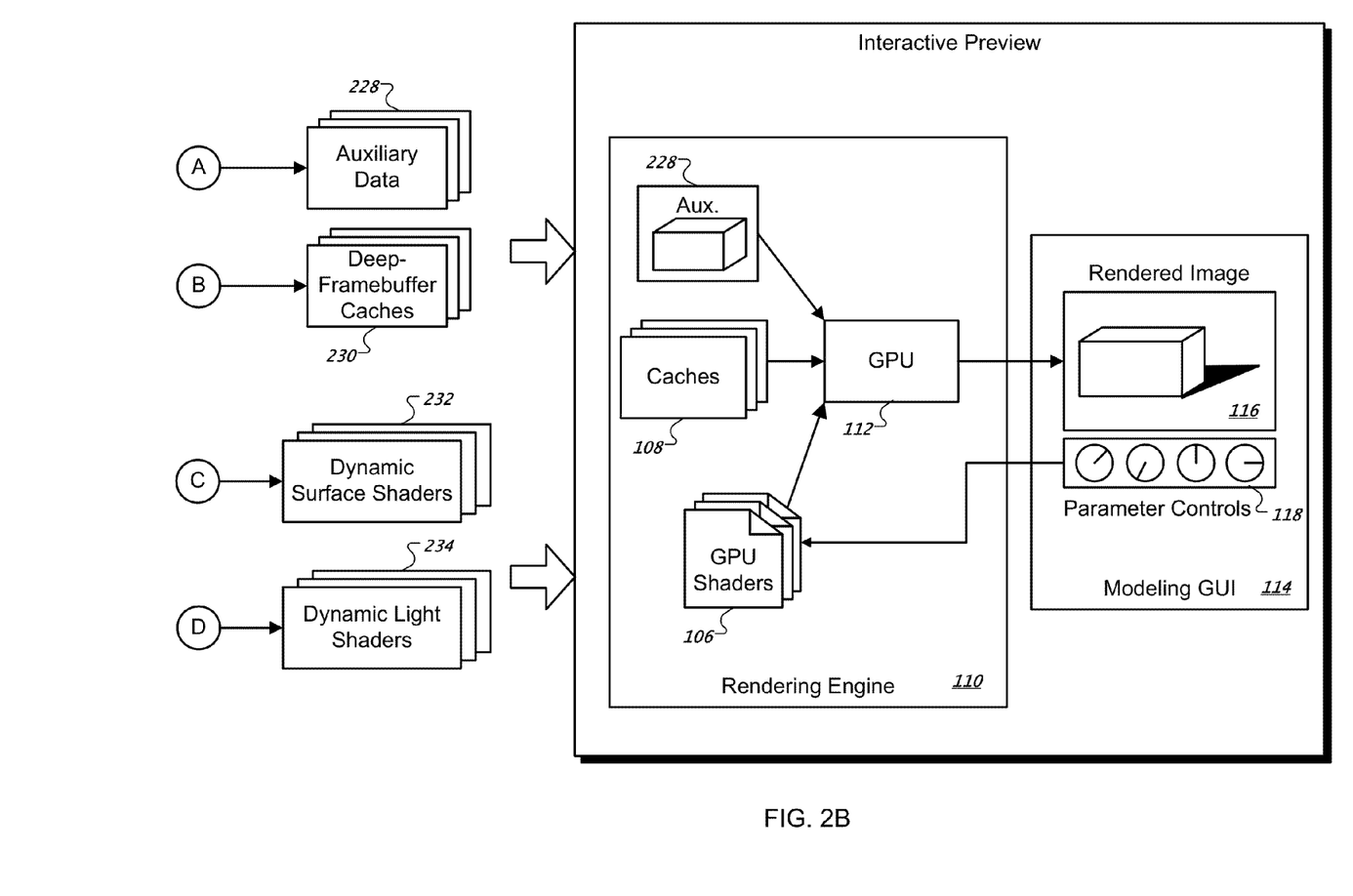

FIGS. 2A and 2B are block diagrams of additional aspects of the preview system 100. As illustrated by FIG. 2A, the preview system 100 can receive an input scene 202 that includes one or more light sources 204 and one or more 3D representations 206. For example, a scene can include 3D geometry describing a car, texture information that specifies the material properties of the car, and a point light source located above the car. In various implementations, the light sources 204 and the 3D representations (e.g., geometries and material properties) 206 are described by one or more light shaders 208 and one or more surface shaders 210, respectively. In general, the light shaders 208 determine the color of the light emitted from the light sources 204 and the surface shaders 210 determine the optical properties for the one or more surfaces of the 3D representations 206 being illuminated.

The input light shaders 208 and surface shaders 210 are processed by the preprocessor 104's specializing compiler 212. The specializing compiler 212 splits the light shaders 208 and surface shaders 210 into dynamic shaders 232, 234 (FIG. 2B) and caching shaders 216. A dynamic shader 232, 234 is one that depends on a dynamic input parameter to the shader, such as values provided by the user interface parameter controls 118. Within this document, we define the term "uniform string" to mean a string whose value is the same over all samples for a given shader. String values in the dynamic shaders 232, 234 that are identical over all samples are so-called uniform values. That is, they have the same value over all samples for a given shader. Within this document, we define the term "varying string" to mean a string whose value is different than the other samples for at least one sample of a given shader. In further implementations, dynamic shaders 232, 234 are Cg shaders that execute on the GPU 112 and the caching shaders 216 are executed by a RenderMan instance 218 as part of the preprocessor 104's activities. The caching shaders 216 are executed in order to determine the value of non-literal strings which may be stored in the GPU 112's cache 108 for use by the dynamic shaders 232, 234 at runtime. In various implementations, literal and non-literal strings in RSL input shaders 208, 210 are automatically translated to structure data types in Cg shaders 232, 234. The Cg structure includes fields for all of the common ways that a string could be used in the RSL. Part of the translation process performed by the preprocessor 104 generates code to access the appropriate field in the Cg structure based on the usage in the RSL shader. By way of illustration, there is a field in the Cg structure data type to hold a unique identifier (e.g., a floating point number) assigned to a given string value in RSL, a separate field that holds a Cg texture handle when the string is used as a texture reference in RSL, and two matrix fields representing a coordinate system and its inverse when the string is used as a named coordinate system in RSL. The Cg structure is described further in reference to FIG. 4 below.

In various implementations, a string's unique identifier is determined with the aid of a string map 214. The string map 214 is a table that contains associations between string values and their unique identifiers. When a string value needs to be converted to a non-string representation, the map is searched to see if the string value is already in the map 214. If so, the string value's associated unique identifier is used in place of the string's value. Otherwise, the string value is added to the table 214, assigned a unique identifier, and the unique identifier is used in place of the string value. This process can be performed by the preprocessor 104, the specializing compiler 212, the caching shaders 216, and by the GUI 114 since each has access to the string map 214.

When a string value is encountered in an RSL input shader, the value in some cases is a literal string that is specified directly within the shader code itself. This literal string can be assigned a unique identifier at the time that the RSL shader code is translated to Cg code. The string value to unique identifier map 214 records the assignments.

In other cases, the value of a string will not be known until the shader is actually executed. For example, the user can supply the value of the string as an input parameter to the shader using GUI 114 and then interactively manipulate the string parameter value as the translated Cg code (i.e., the dynamic shaders 232, 234) executes on the GPU 112. To handle this case, the new string value is looked up at run-time in the string map 214 and then the unique identifier is bound to the corresponding dynamic shader 232, 234 string parameter. If the value that the user types in has not been previously encountered, then a new unique identifier is assigned to the string value and recorded into the map 214.

Another case that can occur is when a string value is not yet known until the shader is actually executed and, moreover, the string value is potentially different for at least one of the samples that is shaded by the RSL shader or translated Cg shader. To handle this case, a unique identifier is assigned at the time that the caching shaders 216 are executed by RenderMan 218 for each sample that is shaded, and then the assigned unique identifier is recorded into the cache 108 (e.g., a deep-framebuffer channel) that will be accessed by the dynamic shaders 232, 234 on the GPU 112 at run-time to re-shade the samples. As the caching shaders 216 are executed for each sample, the map 214 is updated.

RSL permits manipulation of string values within the shader code by way of dynamic shared object (DSO) 222 plugin calls. When the caching shaders 216 refer to a call to a DSO 222, the caching shaders 216 are instrumented such that a return string value from the call is automatically entered into the cache 108. That is, a unique string identifier is assigned at the time that the RSL shader is executed to the return value of DSO plugin calls that return string values for each sample that is shaded. As the RSL shader is executed for each sample, the string value to unique identifier map is updated.

In some implementations, the RenderMan instance 218 can generate a set of auxiliary data as a result of executing the caching shaders 216 that can be used during the execution of the dynamic shaders 232, 234. For example, as illustrated by off-page connector A, the RenderMan instance 218 can generate auxiliary data 228 such as shadow geometry, translucency samples, or other data used in such effects as shadow mapping, subsurface scattering, or other multi-pass rendering effects, to name a few examples.

Figure 3:
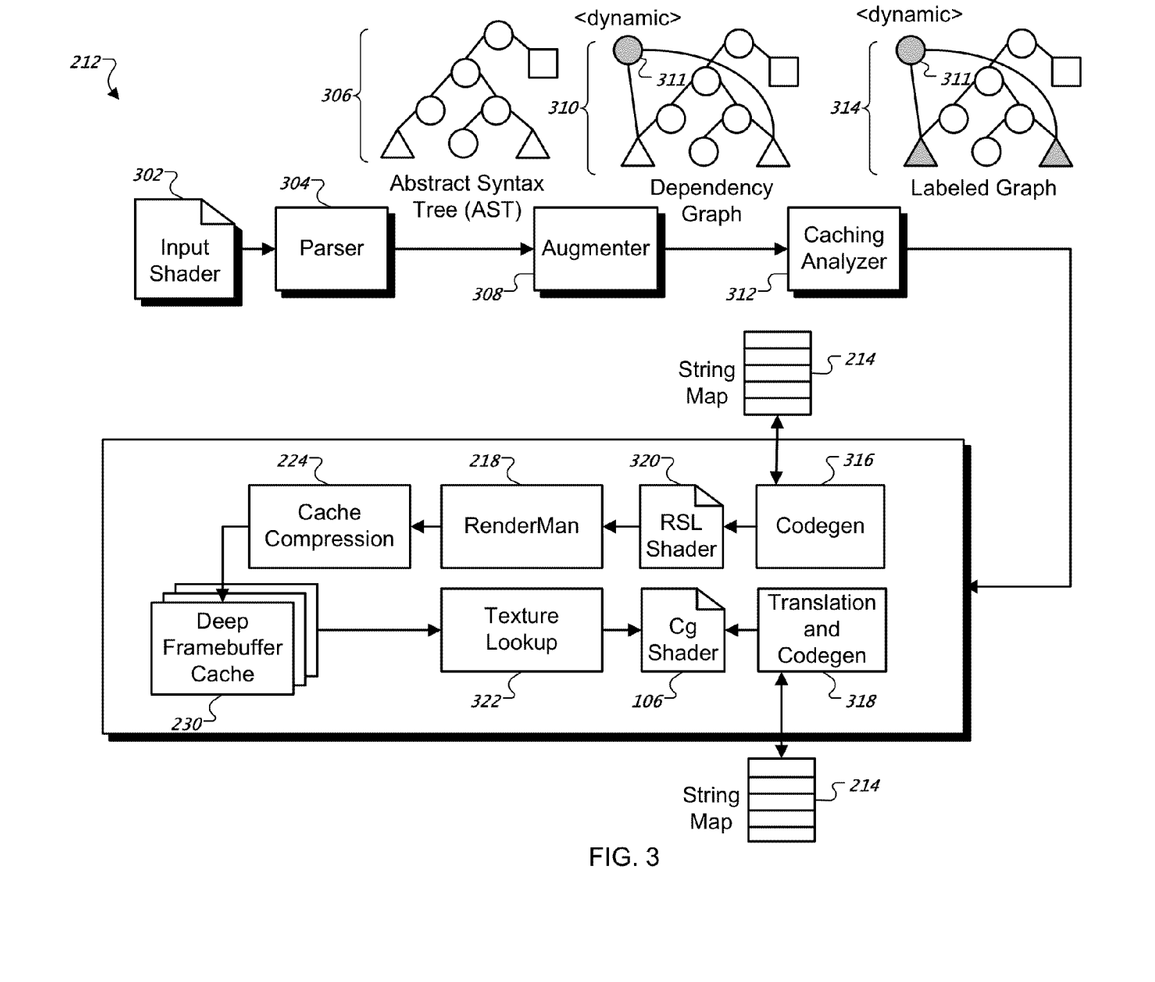
FIG. 3 is a block diagram of an example specializing compiler.

FIG. 3 is a block diagram of an example specializing compiler 212. In various implementations, the specializing compiler 212 generates an abstract syntax tree (AST) and determines which expressions in the AST are directly or indirectly related to input that may be manipulated at run-time (e.g., through the parameter controls 118). The specializing compiler 212 can receive an input shader 302. For example, the specializing compiler can receive light shaders 208, surface shaders 210, or both. The specializing compiler 212 can then parse the shader using parser 304. The parser 304 can parse the shader language code and generate an AST. For example, the parser 304 cart generate AST 306 from input shader 302. An AST is a directed tree that contains operators at internal nodes and operands at leaf nodes of the tree. For example, the expression "x=1+2" can be parsed into an AST where "=" is the root node, "x" is a leaf node off of the root node, "+" is an internal node off of the root node, and "1" and "2" are the left and right leaf nodes off of the internal node, respectively.

Once the AST 306 is constructed, the specializing compiler 212 uses an augmenter 308 to augment the AST into a dependency graph 310. For example, the augmenter 308 can add global dependencies to the AST 306 to determine dependencies between expressions of the AST 306 and input parameters (e.g., dynamic node 311). The specializing compiler 212 can connect the other nodes to the dynamic node 311. The specializing compiler 212 can then use connectivity of the various nodes to determine which nodes of the dependency graph 310 are directly or indirectly connected to a dynamic node.

The specializing compiler 212 uses the dependency graph 310 to construct a labeled graph 314. In various implementations, the dependency graph 310 is analyzed by a caching analyzer 312 to determine if expressions are cached (e.g., in deep-framebuffer caches 230) or if the expressions are dynamic (e.g., through the parameter controls 118). Moreover, the caching analyzer 312 can constrain the dynamic expressions to those operations that can be executed on the GPUs 112. Once the specializing compiler determines the expressions that are cached and the expressions that can be provided at run-time, the specializing compiler can generate one or more shaders.

For surface shaders, the specializing compiler 212 typically generates one shader for writing out the cached static expressions, and one shader for reading in the previously cached static expressions and re-computing the dynamic expressions. For example, shaders that write out cached expressions can be generated by code generator module 316. As another example, shaders that read in the cached expressions and re-compute dynamic expressions can be generated by translation and code generator module 318.

In various implementations, the code generator module 316 generates a shader using the first shader language. For example, code generator module 316 can generate an RSL shader 320 that includes additional instructions to write out cached expressions to a deep-framebuffer cache 108. Once the RSL shader 320 has been generated, it is provided to the RenderMan instance 218, and the scene is rendered using the caching-writing versions of the RSL shaders 320. The RenderMan instance 218 can execute the RSL shader 320, and optionally use the cache compression module 224 to compress values determined by the RenderMan instance 218 to generate the deep-framebuffer cache 230.

Typically, the deep-framebuffer cache 230 is referenced as one or more textures in the target shaders 106. To reference the deep-framebuffer cache 230 as a texture, the specializing compiler 212 can generate one or more texture references. For example, the specializing compiler 212 can generate one or more texture lookup instructions 322.

In various implementations, the translation and code generator module 318 generates shaders in the target shader language that use the texture lookups 322 to access the deep-framebuffer cache 230 as one or more textures. For example, the translation and code generator module 318 can generate one or more Cg shaders 106. The translation and code generator module 318 translates aspects supported by the input shader language into aspects supported by the target shader language. For example, the translation and code generator module 318 can translate message-passing functionality in the RSL shader language into global variables that are supported in the Cg shader language. The translation and code generator module 318 can in various implementations access the string map 214. For example the translation and code generator module 318 can encode identified string tokens (e.g., string variables) as unique floating point values and store the mapping between the string tokens and the unique floating point values in the string map 214.

Figure 4:
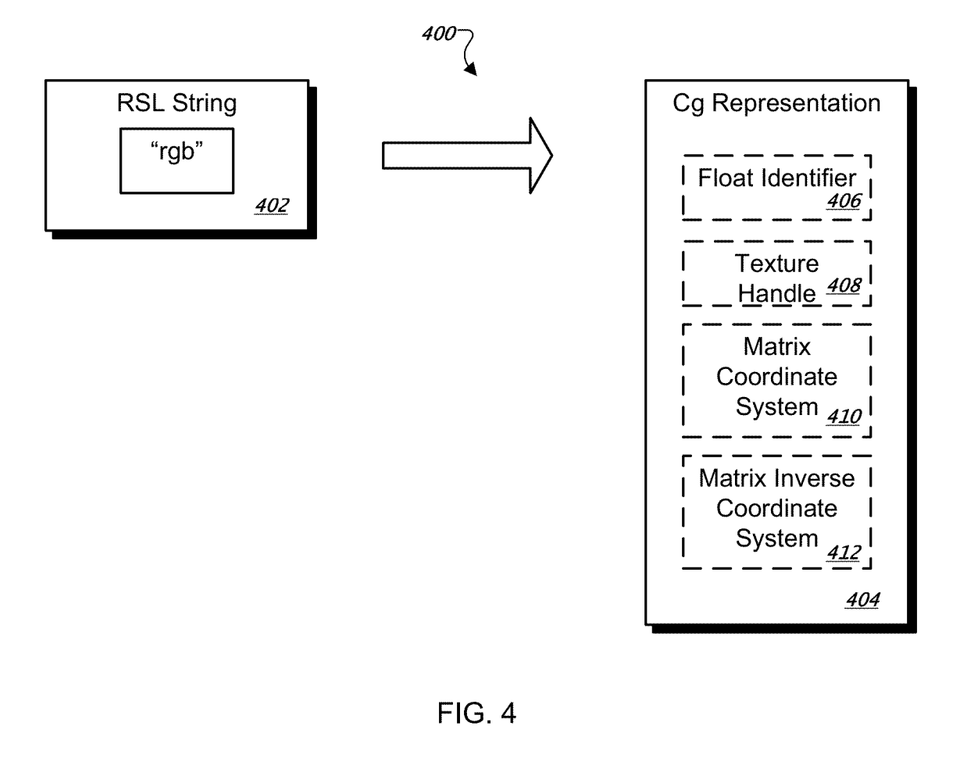
FIG. 4 is a block diagram of a mapping between an RSL string and a Cg representation.

FIG. 4 is a block diagram of a mapping 400 between an RSL string and a Cg representation. In various implementations, the specializing compiler 212 receives one or more RSL strings, determines the kind of data the string represents, and generates an appropriate representation that is supported in the Cg shader language. For example, consider RSL string 402 "rgb." The RSL string 402 "rgb" can be either a literal string or a non-literal string. Moreover, if the RSL string 402 "rgb" is a non-literal string, the RSL string 402 can be further classified as a uniform string or a varying string. A uniform string is a string whose value is the same over all samples for a given shader. Alternatively, a varying string is a string whose value is not the same over all samples for a given shader.

Depending on the type of string (e.g., literal string or non-literal string and uniform or varying), and the type of information encapsulated by the string, the interactive preview system 100 can generate supported Cg representations 404 at appropriate times (e.g., at RSL shader compile-time, at RSL shader run-time, or at Cg shader run-time). For example, if the value of "rgb" describes a literal string, a unique numeric (e.g., floating point) representation 406 can be generated and stored at compile-time of the RSL shaders 102 (e.g., by specializing compiler 212). As another example, if the value of "rgb" represents a uniform texture, a reference to the texture (e.g., texture handle 408) can be generated and stored during Cg run-time (e.g., during execution of the Cg shader). As another example, if the value of "rgb" represents a varying coordinate system, one or more matrices (e.g., matrix coordinate system 410, inverse matrix coordinate system 412, or combinations thereof) can be generated and stored during RSL run-time (e.g., during execution of the RSL shader 320 by the RenderMan instance 218).

Figure 5:
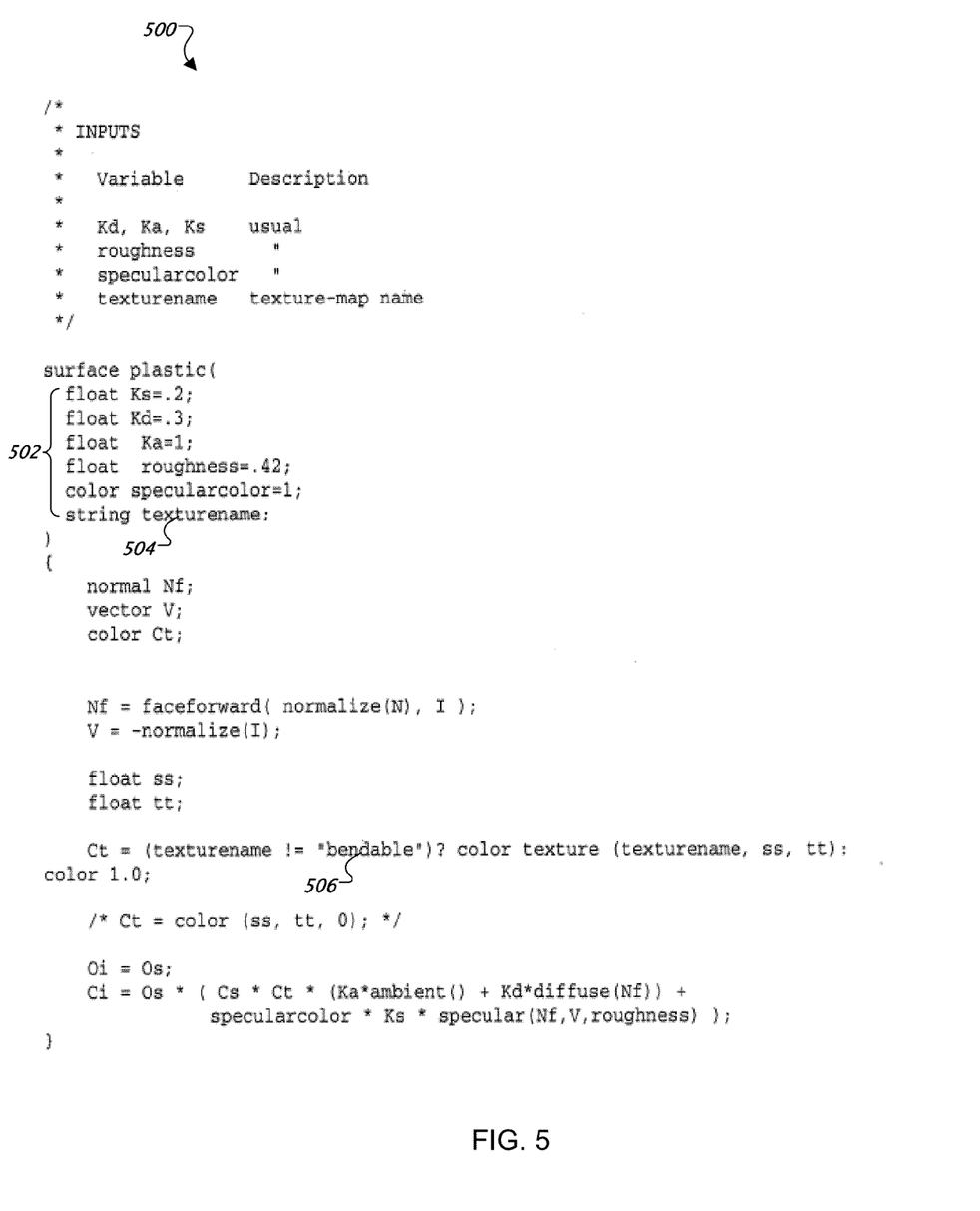
FIG. 5 is an example code fragment that is used to define a shader.

FIG. 5 is an example code fragment 500 that is used to define an RSL shader in various implementations the code fragment 500 can be used to define an input shader 102. As illustrated by FIG. 5, the code fragment 500 illustrates a surface shader, as defined by parameters 502. For example, Ks specifies a specular reflection property for the surface. As another example, Kd specifies a diffuse reflection property for the surface. When the specializing compiler 212 parses parameters 502, it can generate an AST. For example, the expression "Ks=0.2" can be used to generate a portion of the AST where "Ks" and "0.2" are leaf nodes, and "=" is the root node to the leaf nodes.

In addition, the code fragment 500 includes different string variables. For example, the string variable "texturename" 504 takes on a value that is a non-literal string. As another example, the expression "texturename !="bendable"" includes the literal string "bendable" 506 and the non-literal string "texturename" 504. When the specializing compiler parses code fragment 500, expressions can be split into dynamic and cached expressions. In addition, literal strings and non-literal strings can be identified within the expressions. For example, the expression "texturename !=bendable" can be parsed as a dynamic expression because the value of "texturename" 504 can be modified during Cg runtime. Moreover, because "bendable" 506 can be parsed as a literal string, the specializing compiler 212 can map the string "bendable" to a non-string representation (e.g., the floating point value 0.3) and store it in the string map 214.

Figure 6A:
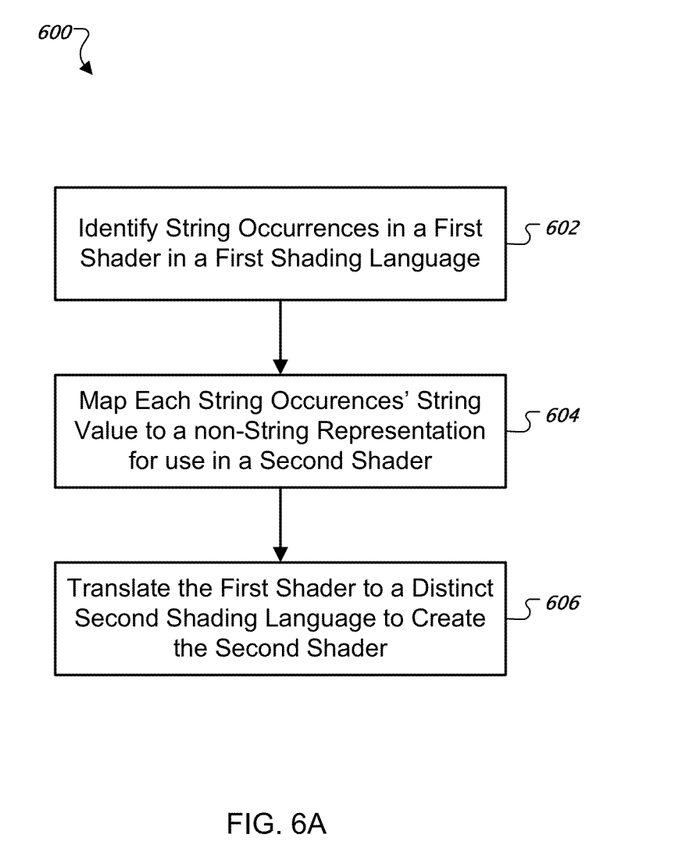
FIG. 6A is a flow chart of an example method for translating a source shader to a target shader.

FIG. 6A is a flow chart of an example technique 600 for translating a first shader into a second shader. In various implementations, the one or more first shaders are received and translated into second shaders by replacing occurrences of unsupported or partially unsupported data types in the second shading language with supported alternate representations. For example, RSL shaders can be translated into Cg shaders by replacing strings with non-string (e.g., Cg structure) representations.

In step 602, string occurrences in a first shader corresponding to a first shader language are identified. For example, the specializing compiler 212 can receive an RSL shader 102. The specializing compiler 212 can identify literal string and non-literal string occurrences located in the RSL shaders 102.

In step 604, each identified string occurrence's value is mapped to a non-string representation that is stored for use during the execution of the second shader. For example, unique floating point values, unique integers, one or more matrices, and one or more texture references can be stored in the string map 214. Moreover, identical string values are mapped to the same identifiers in the string map 214.

In step 606, the first shader is translated into a distinct second shader language. For example, the specializing compiler 212 can translate an RSL shader 102 into a Cg shader 106 by constructing a labeled graph 314. Moreover, each string occurrence is translated into a memory access for the string occurrence's respective non-string representation. For example, the code generated by 318 can include instructions that access memory corresponding to locations in the string map 214. As another example, the code generated by 318 can include instructions that access the deep-framebuffer caches 230.

In some implementations, the order of the steps of method 600 can change. For example, because some values can not be known until Cg run-time (i.e., after the first shader language is translated into the second shader language), the mapping of string occurrences in step 604 can occur after step 606.

Figure 6B:
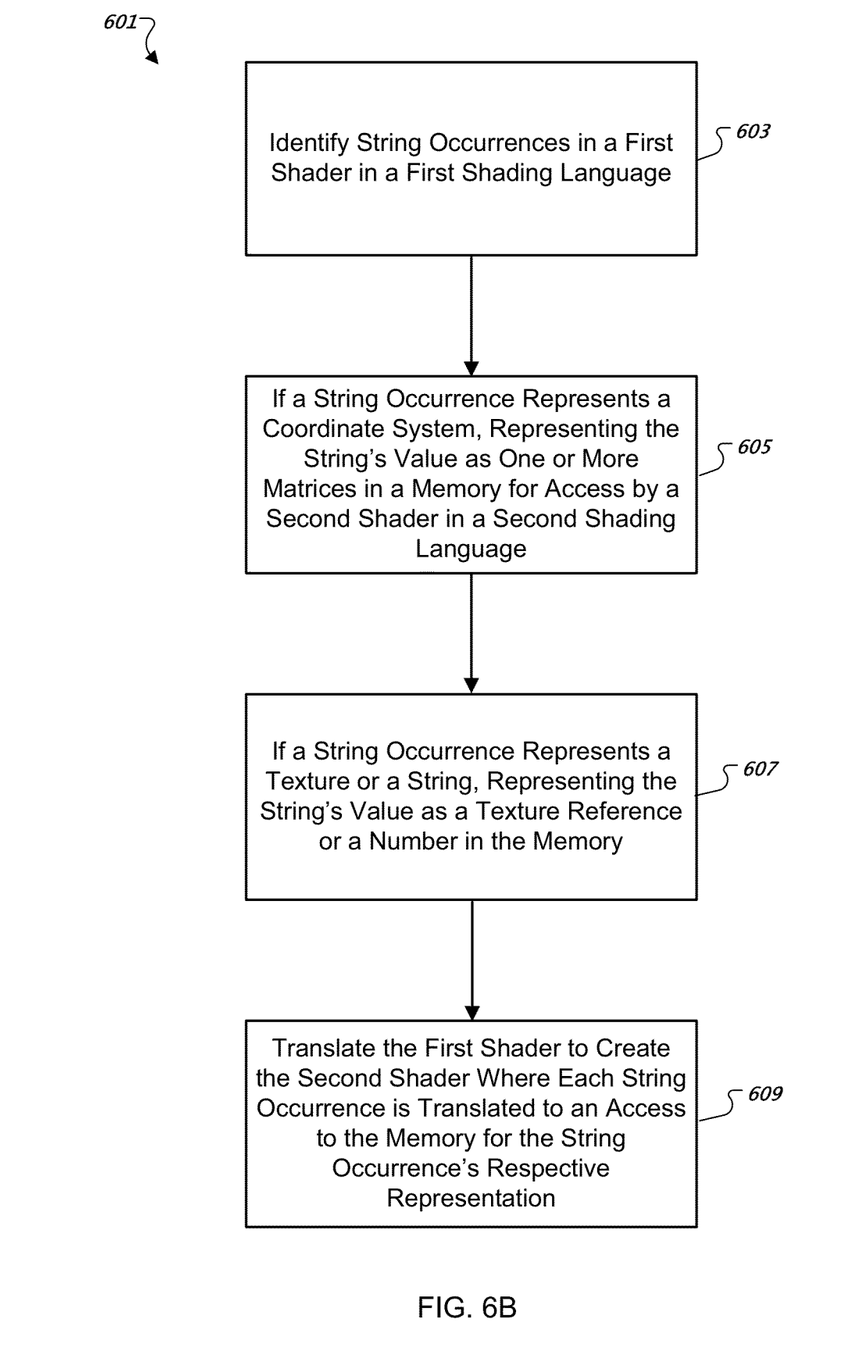
FIG. 6B is a flow chart of another example method for translating a source shader to a target shader.

FIG. 6B is a flow chart of another example technique 601 for translating a source shader to a target shader in step 603, string occurrences are identified in a first shader in a first shading language, where each occurrence is a literal string or a non-literal string value. For example, the specializing compiler 212 can identify string occurrences located in the RSL shaders 102.

In step 605, for each string occurrence, if the occurrence represents a coordinate system, the string's value is represented as one or more matrices in a memory (e.g., cache 108) for access by a second shader in a distinct second shading language. In step 607, for each string occurrence, if the occurrence represents a texture or a string, the string's value is represented as a texture reference or a number, respectively, in the memory.

In step 609, the first shader is translated to create the second shader where each string, occurrence is translated to an access to the memory for the string occurrence's respective representation. For example, the code generated by 318 can include instructions that access memory corresponding to locations in the string map 214. As another example, the code generated by 318 can include instructions that access the deep-framebuffer caches 230.

Figure 7:
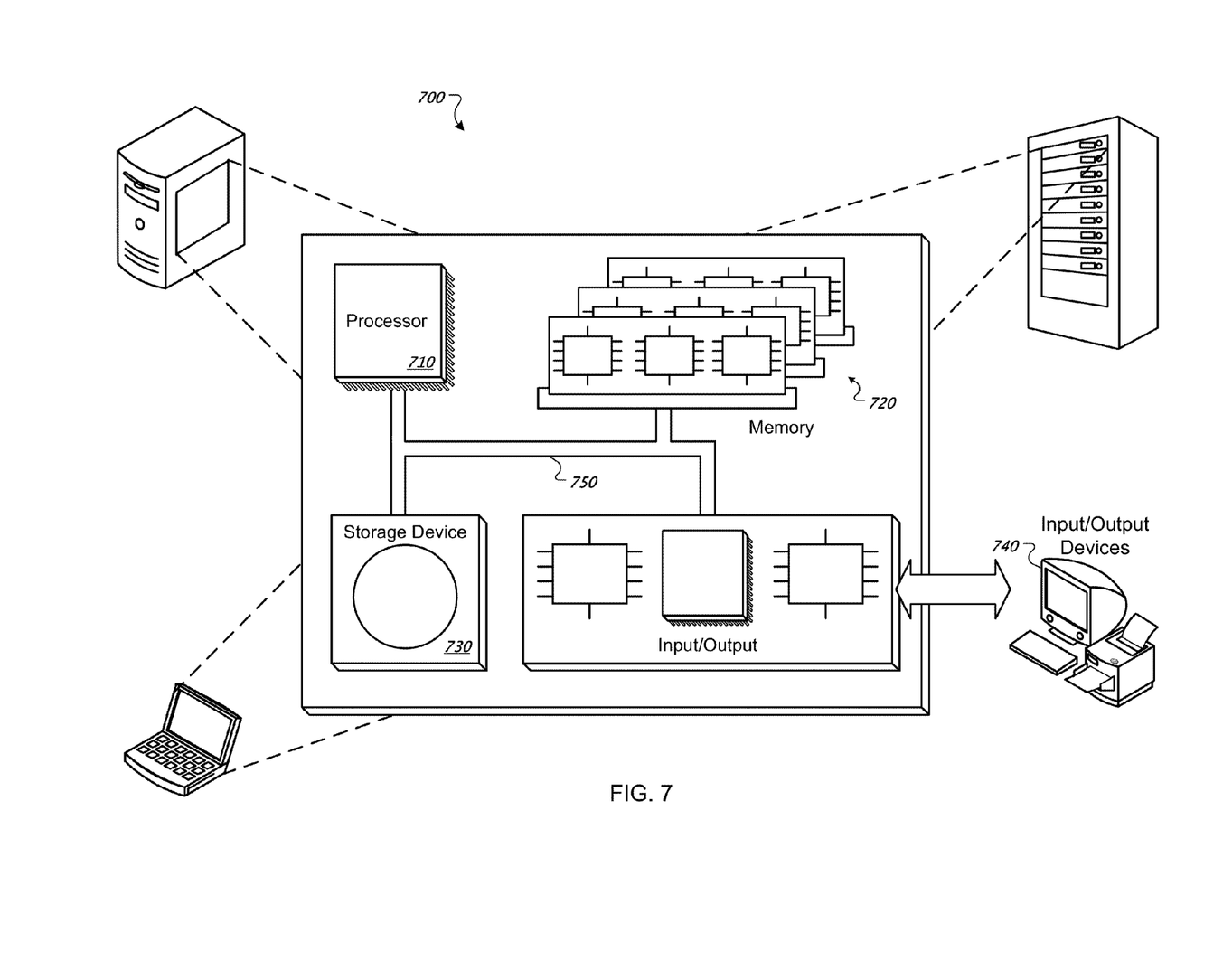
FIG. 7 is a schematic diagram of an example computing system.

FIG. 7 is a schematic diagram of a generic computer system 700. The system 700 can be used for the operations described in association with any of the computer-implement techniques and systems described previously, according to various implementations. For example, the system 700 can be used to implement the interactive preview system 100. The system 700 includes one or more processors 710, a memory 720, a storage device 730, and an input/output device 740. Each of the components 710, 720, 730, and 740 are interconnected using a system bus 750. The processor 710 is capable of processing instructions for execution within the system 700. The processor 710 is a single-threaded or multi-threaded processor having one or more processor cores. The processor 710 is capable of processing instructions stored in the memory 720 or on the storage device 730 to display graphical information for a user interface on the input/output device 740.

The memory 720 stores information within the system 700. For example, the memory 720 can be used to store input and target shaders, string maps, and other data structures needed by the translation and runtime processes. The storage device 730 is capable of providing storage for the system 700. In one implementation, the storage device 730 is a computer-readable medium. In various different implementations, the storage device 730 can be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can in various implementations be performed by, and apparatus can in various implementations be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what can be claimed, but rather as descriptions of features specific to particular embodiments of the invention. Certain features that are described in this specification in the context of separate embodiments can in various implementations be implemented in combination in a single embodiment. Conversely, various features that are described in the context of a single embodiment can in various implementations be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method for translating a first shader in a first shading language to a second shader in a second shading language, comprising:
    identifying string occurrences in a first shader in a first shading language, where each occurrence is a literal string or a non-literal string value;
    mapping each string occurrence to a non-string representation and storing each representation in a memory for access by a second shader during execution of the second shader, where identical string values are mapped to identical non-string representations;
    translating the first shader to a distinct second shading language to create the second shader where each string occurrence is translated to an access to the memory for the string occurrence's respective non-string representation;
    generating one or more images at least in part using the second shader.

2. The method of claim 1, further comprising: determining the value of a string occurrence by evaluating one or more shading language expressions in the first shading language to determine each occurrence's string value.

3. The method of claim 2 where evaluating the one or more shading language expressions includes executing code that is not part of the first shader.

4. The method of claim 1 where the second shader is configured to be executed on a graphics processor unit.

5. The method of claim 1 where the memory is included in the graphics processor unit.

6. The method of claim 5 where the memory is a deep-framebuffer, a data structure or a shader parameter.

7. The method of claim 1 where a string value represents a coordinate system, a texture, or a string value.

8. The method of claim 1 where a non-string representation is one or more of: a unique integer or floating-point number, a texture reference, a matrix, and a structure.

9. The method of claim 1 where the first shading language is RenderMan Shading Language and the second shading language is Cg.

10. The method of claim 1, further comprising: receiving one or more input literal strings; mapping each input string's value to a non-string representation, where identical input string values are mapped to identical non-string representations; and storing each input string's representation in the memory for access by a second shader.

11. A computer-implemented method for translating a first shader in a first shading language to a second shader in a second shading language, comprising:
    identifying string occurrences in a first shader in a first shading language, where each occurrence is a literal string or a non-literal string value;
    for each string occurrence, if the occurrence represents a coordinate system, representing the value as one or more matrices in a memory for access by a second shader in a distinct second shading language;
    for each string occurrence, if the occurrence represents a texture or a string, representing the value as a texture reference or a number, respectively, in the memory;
    translating the first shader to create the second shader where each string occurrence is translated to an access to the memory for the string occurrence's respective representation; and
    generating one or more images at least in part using the second shader.

12. The method of claim 11 where the first shading language is RenderMan Shading Language and the second shading language is Cg.

13. The method of claim 11 where identical string occurrences have corresponding identical non-string representations in the memory.

14. The method of claim 11 where the second shader is configured to be executed on a graphics processor unit.

15. The method of claim 11 where the memory is included in the graphics processor unit.

16. The method of claim 15 where the memory is a deep-framebuffer, a data structure or a shader parameter.

* * * * *

UNITED STATES PATENT AND TRADEMARK OFFICE
CERTIFICATE OF CORRECTION

PATENT NO. : 8,462,158 B2
APPLICATION NO. : 13/481563
DATED : June 11, 2013
INVENTOR(S) : Charlie A. Kilpatrick Page 1 of 1

It is certified that error appears in the above-identified patent and that said Letters Patent is hereby corrected as shown below:

In the Specifications Section:

Column 2, Line 12;
        Delete: "shakier"
        Replace with: "shader"

Column 5, Line 11;
        Delete: "hound"
        Replace with: "bound"

Column 7, Line 32;
        Delete: "…define an RSL shader in various implementations the code…"
        Replace with: "…define an RSL shader. In various implementations the code…"

Column 8, Line 31;
        Delete: "…to a target shader in step 603, string occurrence are identified…"
        Replace with: "…to a target shader. In step 603, string occurrence are identified…"

Signed and Sealed this
Third Day of September, 2013

Teresa Stanek Rea
*Acting Director of the United States Patent and Trademark Office*